(No Model.)
C. A. NEUERT.
BRUSH.
No. 602,193.
Patented Apr. 12, 1898.
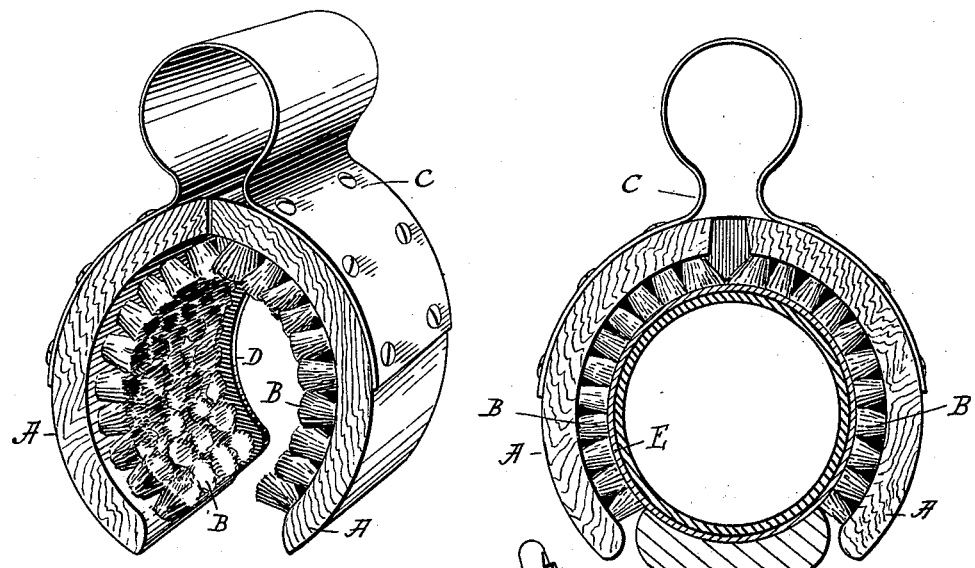
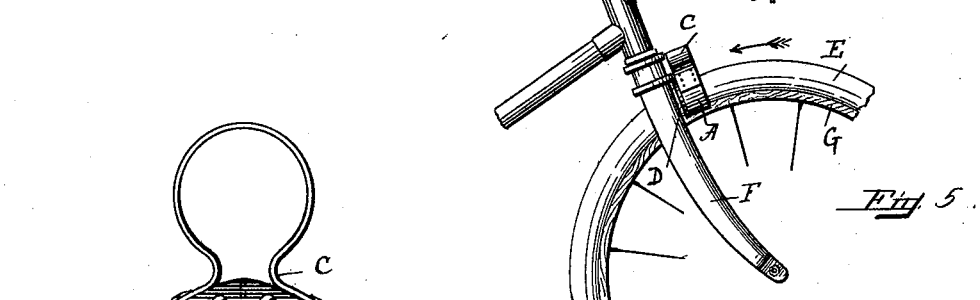
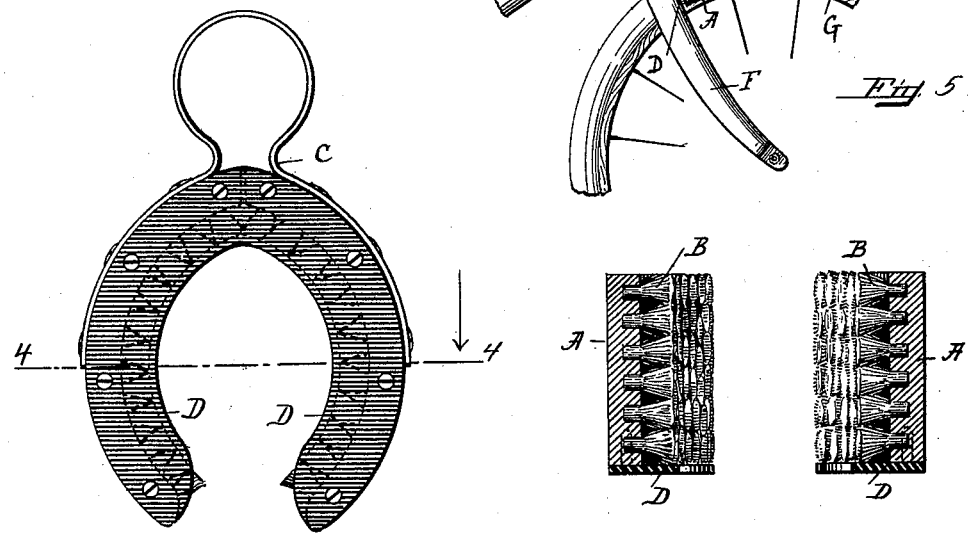
Witnesses:
Lauritz N. Möller
Henry R. Page
Inventor:
Charles A. Neuert
by Ivan Andreen
his atty.

UNITED STATES PATENT OFFICE.

CHARLES A. NEUERT, OF BOSTON, MASSACHUSETTS.

BRUSH.

SPECIFICATION forming part of Letters Patent No. 602,193, dated April 12, 1898.

Application filed May 21, 1897. Serial No. 637,506. (No model.)

*To all whom it may concern:*

Be it known that I, CHARLES A. NEUERT, a citizen of the United States, and a resident of Boston, in the county of Suffolk and State of Massachusetts, have invented new and useful Improvements in Bicycle-Tire Brushes, of which the following, taken in connection with the accompanying drawings, is a specification.

This invention relates to improvements in bicycle-tire brushes for the purpose of cleaning and brushing bicycle-tires, and it is constructed as follows, reference being had to the accompanying drawings, wherein—

Figure 1 represents a perspective view of the improved bicycle-tire brush, showing it in its normal position when not in use. Fig. 2 represents an end view of said brush, showing it as applied to a bicycle-tire while in use for cleaning the latter. Fig. 3 represents an end view of the invention as seen from the rear end of Fig. 1. Fig. 4 represents a cross-section on the line 4 4 shown in Fig. 3; and Fig. 5 represents in a reduced scale a portion of the forward portion of a bicycle-frame and forward wheel, showing the position of the improved brush relative to the frame and tire while cleaning and brushing the latter.

Similar letters refer to similar parts wherever they occur on the different parts of the drawings.

My improved bicycle-tire brush consists of a pair of concave jaws or cheeks A A, preferably made of wood and provided on their interior surfaces with concave brushes B B, made of bristles, wire, or other suitable material. The jaws or cheeks A A are connected at their upper ends by means of a yielding spring or spring-plate C, which normally tends to close the cheeks A A and their brushes together when not in use, as represented in Fig. 1.

In practice I prefer to attach to one end of the cheeks A A a yielding scraper D, preferably made of rubber, the inner edge of which is adapted to project slightly beyond the inner ends of the bristles B B, as shown in Figs. 3, 4, and 5, and it serves to remove the dirt from the tire after it has been broken, disintegrated, and partially removed by the brushes B B.

The yielding spring C tends to close the curved brushes, and when the latter are expanded and placed around the tire E, as shown in Fig. 2, said spring serves to hold said brushes with a yielding pressure against the exposed portion of said tire during the cleaning operation.

In Fig. 5, F represents the forward fork of a bicycle, and G represents the rim of the forward wheel, as usual.

In using the device for cleaning the forward-wheel tire E, I expand the jaws or cheeks A A sufficiently to encompass the tire E, after which the improved brush is placed, preferably, against the joint portion of the fork, after which the wheel G is rotated in the direction of arrow shown in Fig. 5, causing the mud or dirt in the wheel to be disintegrated and brushed off by contact with the bristles B and the tire additionally cleaned and removed from accumulations by contact with the yielding scraper D, thus causing the tire to be rapidly brushed and cleaned.

In cleaning the rear wheel the expansive brush is placed around the rear tire and held against the rear fork during the rotation of said rear wheel.

It will thus be seen that during the cleaning of the wheels the brush device is automatically held by the agency of the spring C with a proper and yielding pressure against the tire without the need of hand manipulation by the operator, as is ordinarily the case with other brush devices for this purpose.

Having thus fully described the nature, construction, and operation of my invention, I wish to secure by Letters Patent and claim—

A bicycle-tire brush consisting of a pair of concave expansive brushes, a spring attached to the brush-holders and a yielding scraper or wiper attached to the adjacent ends of the brush-holders substantially as and for the purpose set forth.

In testimony whereof I have signed my name to this specification, in the presence of two subscribing witnesses, on this 18th day of May, A. D. 1897.

CHARLES A. NEUERT.

Witnesses:
ALBAN ANDRÉN,
WILLIAM W. LUMMUS.